United States Patent [19]

Sato et al.

[11] 4,185,148
[45] Jan. 22, 1980

[54] PROCESS FOR PRODUCING THE POLYPROPYLENE FILM FOR ELECTRICAL APPLIANCES

[75] Inventors: Hiroshi Sato, Saeki; Munetsugu Nakatani; Shuichi Sugimori, both of Ohtake, all of Japan

[73] Assignee: Mitsubishi Rayon Company Limited, Tokyo, Japan

[21] Appl. No.: 794,602

[22] Filed: May 6, 1977

[30] Foreign Application Priority Data

May 17, 1976 [JP] Japan .................. 51-56390
May 17, 1976 [JP] Japan .................. 51-56391

[51] Int. Cl.$^2$ .......................................... C08F 110/06
[52] U.S. Cl. .......................... 526/348.1; 264/237; 264/519; 264/560; 264/562; 425/326.1; 526/351
[58] Field of Search .............. 264/95, 89, 237, 519, 264/560, 557, 562; 425/72, 326.1; 526/348.1, 351

[56] References Cited

U.S. PATENT DOCUMENTS

| 2,936,492 | 5/1960 | Swerlick et al. ............ 264/212 |
| 3,007,765 | 11/1961 | Ruyter ........................ 264/291 |
| 3,246,061 | 4/1966 | Blatz ........................... 264/95 |
| 3,385,918 | 5/1968 | Jack et al. ................... 264/95 |
| 3,450,806 | 6/1969 | Matsuo et al. ............... 264/95 |
| 3,796,781 | 3/1974 | Edwards et al. ............. 264/95 |
| 3,822,333 | 7/1974 | Haruta et al. ................ 264/95 |

FOREIGN PATENT DOCUMENTS

| 230105 | 4/1959 | Australia .................. 264/209 |
| 4918111 | 5/1970 | Japan . |
| 49-1781 | 1/1974 | Japan . |

*Primary Examiner*—Jeffery R. Thurlow
*Attorney, Agent, or Firm*—Oblon, Fisher, Spivak, McClelland & Maier

[57] ABSTRACT

A polypropylene film which is useful for electrical devices is produced by biaxially stretching an unstretched polypropylene molded article having, on at least one side, a surface layer having $\beta$-form crystals, of mean diameter over 7 $\mu$m, under such conditions that the stretching temperature at the stretch initiation point is in the range of 145° to 176° C., and the stretch ratio in one direction is less than a factor of 8. The resulting stretched polypropylene film is characterized by excellent mechanical properties, a very dense inner structure, and high air-tightness. The surface of the film has an efficiently roughened, fine, uneven structure containing crater-like patterns or an isotropic network structure and an anisotropic network structure, which is aligned in the extrusion direction. Therefore, the polypropylene film of the present invention can be readily impregnated with insulating oils, and hence can be used in various electrical devices, such as capacitors, electric cables, transformers and the like.

8 Claims, 2 Drawing Figures

PROCESS FOR PRODUCING THE POLYPROPYLENE FILM FOR ELECTRICAL APPLIANCES

BACKGROUND OF THE INVENTION

1. Field of the Invention

The present invention relates to a process for producing a polypropylene film which can readily be impregnated with insulating oils, and hence which can be used in oil-impregnated electrical devices.

2. Description of the Prior Art

Biaxially stretched polypropylene film is known to possess excellent insulating resistance and dielectric characteristics in comparison to insulating paper which heretofore has been used. Consequently, the film has recently been used in the manufacture of various electrical devices such as electrical cables, capacitors and transformers which are required to be compact in size, light in weight and possess high durability. However, the surface of the conventional polypropylene film is very smooth in comparison to the surface smoothness of the conventional insulating paper, so that when it is used in a convoluted form, the surfaces of the film or the surface of the film and the surface of the electrode foil tend to stick and to adhere tightly to each other. Consequently, it is difficult to sufficiently eliminate air or water which is entrained in the central portion of the convoluted material even when it is dried in a vacuum. Further, when the convoluted material after vacuum drying is impregnated with an insulating oil, the portions of the material unimpregnated with the insulating oil form locally within the convolution because the impregnability of the material is inferior. If such a convoluted material is subjected to a voltage, it suffers the drawback that a corona discharge is liable to occur with the result that premature dielectric breakdown undesirably occurs under low voltage conditions in the unimpregnated portions.

In order to reduce these drawbacks, a method has been proposed in which a polypropylene film is used in conjunction with insulating paper as a dielectric, i.e., as a composite dielectric, in the fabrication of film capacitors. However, the dissipation factor of the insulating paper is large and the dielectric strength thereof is low. Moreover, it is very difficult to thoroughly eliminate water which is entrained so that the use of such insulating paper makes it difficult to obtain a capacitor having satisfactory characteristics. Still another method which improves the impregnating ability of insulating oil involves roughening one or both surfaces of the polypropylene film by an embossing treatment which forms irregularities on the surface of the film. But in such a method, a complicated film manufacturing process is required and in order to achieve a greater degree of oil impregnability of the film, it is necessary to increase the depth of the surface irregularities of the film. Furthermore, the characteristics of the film tend to decrease and the relationship of the oil impregnability of the film to the concavity of the film surface inversely decreases. A need therefore continues to exist for a polypropylene film which is useful in the manufacture of electrical devices which possess superior dielectric characteristics, a susceptibility to being impregnated by insulating oils and which exhibits none of the disadvantages described above.

SUMMARY OF THE INVENTION

Accordingly, one object of the present invention is to provide a polypropylene film which possesses excellent dielectric characteristics and oil impregnability characteristics for use in electrical devices.

Another object of the present invention is to provide a method for manufacturing a polypropylene film which possesses excellent dielectric characteristics.

Still another object of the present invention is to provide an unstretched polypropylene molded article having at least one surface layer containing, $\beta$-form crystals of which the mean diameter is over 7 $\mu$m.

Briefly, these objects and other objects of the present invention as hereinafter will become more readily apparent can be attained by a method for producing a polypropylene film for electrical devices by biaxially stretching an unstretched polypropylene molded article having, on at least one side, a surface layer containing $\beta$-form crystals of which the mean diameter is over 7 $\mu$m, under such conditions that the stretching temperature at the stretch initiation point is in the range of 145° to 176° C. and the stretch ratio in one direction is less than a factor of 8.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
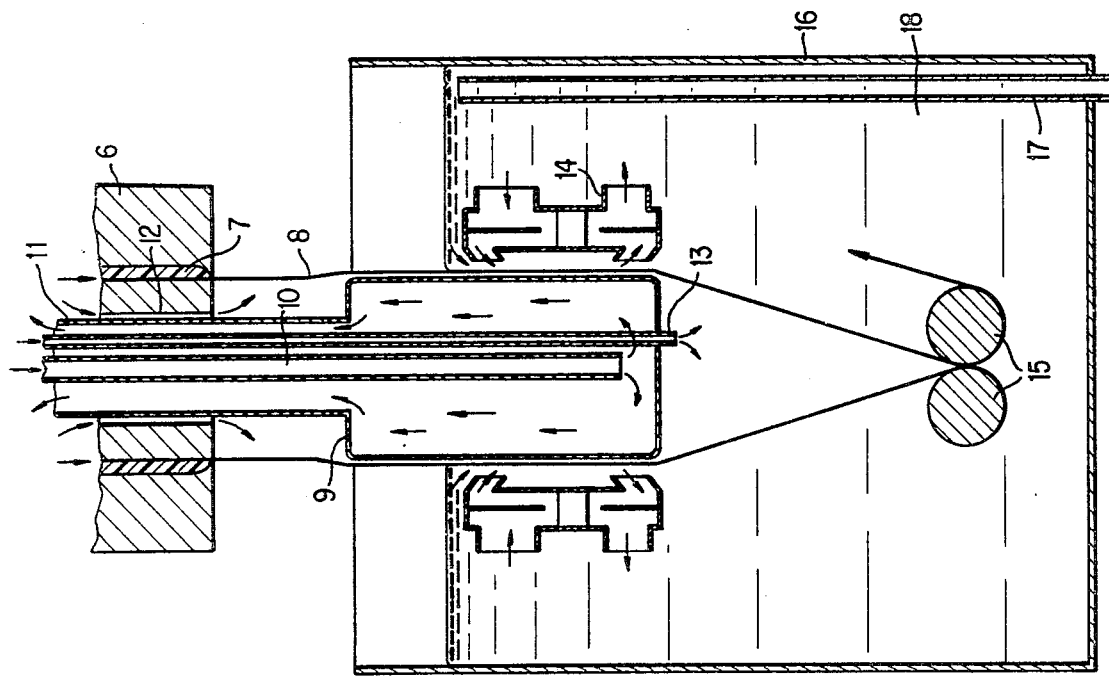
FIG. 1 shows an embodiment of the extrusion apparatus of the invention in which a crystalline polypropylene is melt-extended into a tubular form.

The essence of the present invention resides in a process for producing a polypropylene film for electrical devices wherein an unstretched, molded polypropylene article possessing, on at least one side, a surface layer characterized by having a $\beta$-form crystal of a mean diameter of over 7 $\mu$m, is biaxially stretched under such conditions that the stretching temperature at the stretch initiation point is in the range of 145° to 175° C. and the stretch ratio in one direction is less than a factor of 8.

Suitable polypropylene starting materials include not only propylene homopolymers but also copolymers of propylene with minor amounts of other $\alpha$-olefins. The polypropylene is an isotactic polypropylene in which at least 90% of the residue is extracted with boiling n-heptane in 8 hrs. The percentage represents the isotacticity of the polypropylene. The polypropylene may have any degree of polymerization with the requirement that it be melt-moldable, although it is preferable that it have a melt index of 0.5 to 20 as measured at 230° C. under a load of 2.16 kg as specified in ASTM D1238-57T. Other polypropylene materials include both a mixture of polypropylene with a specific crystallization nucleating agent such as quinacridonequinone, substituted quinacridonequinones or a metal chelate compound thereof as well as polypropylene itself which does not contain a $\beta$-form crystallization nucleating agent. When an unstretched polypropylene film which is prepared by melt-molding a resin containing a β-form crystallization nucleating agent, having a β-form crystal structure is stretched, a film having roughened uneven patterns on the film surface may be obtained. When the resulting film is used in the manufacture of electrical devices, the characteristics of the above-mentioned electrical devices may be reduced by the fine voids which are produced in the interior of the film because of the effect of the crystallization nucleating agent present in the film. Therefore it is preferable to use a polypropylene which does not contain a specific crystallization nucleating agent in the practice of the present invention.

In the method of the present invention, the existence of a surface layer containing β-form crystals of a mean diameter of over 7 μm, on at least one side of an unstretched polypropylene molded article is an essential factor. The specific surface layer may be present on one or both sides of the molded article.

When the mean diameter of β-form crystal at a surface layer on at least one side of the polypropylene unstretched molded article in the present invention is less than 7 μm, it is difficult that the desired surface structure providing an excellent impregnancy for insulating oil may be built up in the surface of the stretched film, even though the said unstretched molded article is stretched under the aforesaid conditions. Moreover, generally, the larger the mean diameter of the β-form crystals of the surface layer of the unstretched molded article becomes, the greater the tendency for the development of insulating oil impregnating characteristics of the film obtained by stretching the unstretched molded article. It is preferable that the mean diameter of β-form crystals be substantially of about 100 μm as the size is subject to restriction by the manufacturing process of the film.

Specific forms of the β-form crystals of the present invention include β-form spherulite and pillar-like β-form crystals. The pillar-like β-form crystals are β-form crystals which are grown by centering around streak-like nuclei which are aligned in the direction of extrusion at the time of the production of the unstretched polypropylene molded article. As the pillar-like β-form crystals grow around the centered streak-like nuclei, the crystals have a configuration similar to a cylinder or square pillar wherein each vertical section is of a round shape or polygon. When the pillar-like β-form crystal is observed through a polarizer and at a proper angle under the orthogonal nicol with the aid of a polarization microscope, it can be observed that the length of the crystal is greater than several tens of μm, the streak-like nuclei having a diameter of about 1 μm are present and the β-form crystals grow from each point on the streak-like nuclei in the perpendicular direction thereof. Further, the mean diameter of the vertical section of the pillar-like β-form crystals is from several μm to several tens of μm, and the length thereof equivalent to the streak-like nuclei is from tens of μm to several mm.

The mean diameter of the β-form crystals of the present invention is defined as the mean diameter of the spherulite itself when the crystal is comprised of spherulite or the mean diameter of the vertical section of the pillar-like crystals aligned in the direction of extrusion when the crystals are comprised of pillar-like crystals respectively.

In practicing the present invention, the distribution density of the β-form spherulite is preferably more than 5,000 per cm$^2$ of the film surface when the β-form crystals of the surface layer of the above-mentioned unstretched polypropylene molded article is composed mainly of β-form spherulite. If the distribution density of spherulite is less than 5,000 per cm$^2$ of the film surface, a uniform, uneven structure and isotropic network structure cannot be built up on the surface of the film which is obtained by stretching the unstretched molded article. Further, the desired, excellent insulating oil impregnability characteristics cannot be obtained.

The distribution density of the pillar-like β-form crystals is preferably more than 1,000 per cm$^2$ of the film surface when the β-form crystals of the surface layer of the unstretched molded article are composed mainly of pillar-like β-form crystals. If the distribution density of the crystals is less than 1,000 per cm$^2$ of the film surface, a uniform, uneven structure and anisotropic network structure cannot be built up on the surface of the film which is obtained by stretching the unstretched molded article. Further, the desired excellent insulating oil impregnability characteristics cannot be obtained.

Several methods can be employed for the determination of the mean diameter and distribution density of the β-form crystals in the surface layer of the above-described unstretched polypropylene molded article. In one method a thin leaf of the surface layer of the unstretched molded article is obtained by cutting the surface layer of the article and observing the thin leaf with a polarization microscope and then counting the diameter of the β-form crystals and the number thereof per unit area. It is also possible to easily distinguish the β-form crystals from α-form crystals. In another method of measurement, the diameter and density measurements can be determined by taking advantage of the property of β-form crystals to dissolve in toluene. The β-form crystals of the surface layer of the above-described molded polypropylene article can be dissolved by immersing the molded article for 3 min. in toluene of 92° C. A circular concave mark is formed in the article upon dissolution of the β-form spherulite. On the other hand, a concave strip-like mark remains after dissolution of the pillar-like β-form crystals. The marks are left on the surface layer. The mean diameter and the distribution density of the β-form crystals can be determined by counting the mean diameter and the number of concave marks, as observed by means of a scanning electron microscope or a reflecting microscope. The values of the mean diameter and the distribution density of β-form crystals obtained by the both above-described methods of measurement are very consistent with each other.

An embodiment of the present process can be explained with reference to FIG. 1. A crystalline polypropylene is melt-extruded downward through an annular slit 2 of a ring die 1 equipped with a thermoplasticization melt-extruder tip to form a tubular melt 3. The inner surface of melt 3, while maintaining the suface at a temperature in the range of 130° to 200° C., is instantaneously or intermittently slid in contact with the outer periphery of one or more disc-like members 4 which have a slight roundness of 0.05 to 10mm, preferably 0.1 to 3mm, in terms of radius of curvature, at the outer periphery. At the same time, the outer surface of melt 3 is cooled with a cooling medium which has a temperature of at least 45° C., of a gas such as air or nitrogen gas or a liquid such as water or ethylene glycol, especially preferably water, and then the resulting unstretched tubular molded article is taken up. FIG. 1 shows the case when water 5 is used as the cooling medium. When the inner surface of tubular melt 3 is instantaneously or intermittently slid in contact with the outer periphery of disc-like member 4, the larger the number of the disc-like members 4, the greater the sliding effect of the tubular melt 3 in contact with disc-like member 4. On the other hand, however, the traveling stability of the tubular melt 3 is diminished. Accordingly, it is necessary that the number of disc-like members 4 range from 1 to 10, preferably 3 to 7. In the production of the unstretched tubular molded article taken up from the tubular melt 3, the take-up rate is preferably less than 10m/min.

Suitable materials from which disc-like members 4 are fabricated include various metals, ceramics, glass and polytetrafluoroethylene which may or may not be reinforced with carbon, asbestos or the like. An unstretched molded polypropylene article of which the surface layer is composed mainly of β-form spherulite may be obtained.

Figure 2:
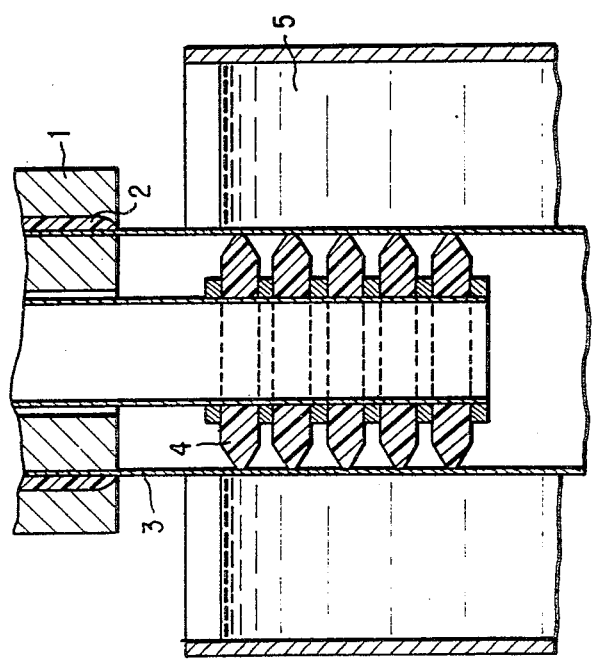
FIG. 2 shows another embodiment of the extrusion apparatus of the invention in which polypropylene is extruded, shaped with compressed air and taken up on rollers.

An embodiment of another process within the scope of the invention can be better understood with reference to FIG. 2.

A crystalline polypropylene material is melt-extruded downward through an annular slit 7 in a ring die 6 which is equipped with a thermoplasticization melt-extruder tip through which a tubular melt 8 is formed. Compressed air is introduced through a compressed air-introducing pipe 12 to swell tubular melt 8 to a diameter equal to or slightly greater than the outer diameter of a cylindrical member 9 which is kept at a temperature in the range of 30° to 110° C., and the inner surface of the tubular melt 8 is slid in contact with the outer surface of cylindrical member 9. At the same time, the outer surface of the tubular melt 8 is cooled with an external cooling medium which is kept at a temperature below the temperature of the cylindrical member 9, of a gas, such as air or nitrogen gas or a liquid, such as water or ethylene glycol, and then the resulting tubular unstretched molded article is gathered up. Of the cooling media, a liquid medium is preferred, water is especially preferred. FIG. 2 shows a case in which a liquid medium is used as the external cooling medium. In such a case, the liquid surface of the cooling medium may be preferably maintained below the point of initiation of contact of the inner surface of the melt 8 with the cylindrical member 9. A vertically movable external cooling liquid tank 16 in which the liquid is maintained at a fixed liquid level in the tank by allowing excess liquid to overflow through overflow pipe 17 may be vertically moved in order to accomplish the above-mentioned process. When the cooling liquid, at the time the tubular melt 8 is cooled, is forcibly moved in the direction shown by the arrows in the drawing, or in the reverse direction, by means of a water ring 14 provided around the cylindrical member 9, the cooling effect of the tubular melt 8 can be achieved in an extremely stable state. This procedure, therefore, is the preferred one.

The interior of the above-mentioned cylindrical member 9 is equipped with a cooling liquid-introducing pipe 10 and a cooling liquid-discharging pipe 11 which penetrate ring die 6, and is always maintained within the previously mentioned temperature range by means of the cooling liquid. The tubular shaped plastic material which has left the cylindrical member 9 is further passed downward, while being filled with compressed air through a compressed air-introducing pipe 13 provided at the lower part of the cylindrical member 9 so that the material does not collapse in the liquid medium 18 in the external cooling liquid tank 16. The material is then gathered up through nip rolls 15.

Suitable materials from which the above-mentioned cylindrical member 9 is fabricated include the usual metals, ceramics, glass, carbon or polymeric substances, and the shape of the surface of the cylindrical member 9 may be any suitable mirror-like, aventurine or textile-like shape. The procedure just described provides for a polypropylene unstretched molded article which has a surface layer composed mainly of pillar-like β-form crystals aligned in the extrusion direction.

Still another embodiment of the present invention involves the preparation of crystalline polypropylene by melt-extrusion through a ring die to form a tubular melt under such conditions that the resin temperature at the time of extrusion from the die orifice is 230° C. or less and the average extrusion linear velocity from the die orifice is 1.5cm/sec or more. The outer surface of the melt is contacted with a medium having a temperature of 45° C. or more, and the resulting tube is taken up while contacting the inner surface thereof with a medium having a temperature less than that of the cooling medium.

The average extrusion linear velocity V(cm/sec) of the resin when it is extruded from the die is determined by the following formula.

$$V = Q/0.75A$$

wherein Q is the weight of the resin extruded per unit time (g/sec), A is the cross-sectional area of the die orifice (cm$^2$), and the value "0.75" is the density (g/cm$^3$) of the resin melt.

The medium which the tubular melt contacts may be a gas, liquid or solid. Suitable gases include air or nitrogen. Suitable liquids include water or ethylene glycol, but the use of water is most advantageous from a practical point of view. Suitable solids include the usual metals, ceramics, glass, carbon and polymeric substances. The shape of the surface of solid may be mirror-like, aventurine or a textile-like shape.

In a preferred embodiment of the above-mentioned process, the tubular melt 8 may be produced by the same manner as the process described above with reference to FIG. 2 except that the resin temperature at the time of extrusion from the die orifice is 230° C. or less, the average extrusion linear velocity from the die orifice is 1.5 cm/sec or more, the temperature of the cylindrical member 9 is maintained less than 45° C., and the temperature of the external cooling medium 18 is maintained above 45° C.

The upper temperature limit of the medium to be contacted with the outer surface of the tubular melt is preferably 130° C., and that of water, when used as the medium, is preferably 90° C.

The procedure first described provides for a polypropylene unstretched molded article which has a surface layer composed mainly of pillar-like β-form crystals aligned in the extrusion direction.

The thickness of the polypropylene unstretched molded article obtained by all of the above described embodiments is preferably at least 300 μm.

In the next aspect of the present invention, the polypropylene molded article which is obtained and having, on at least one side, a surface layer containing β-form crystals of which the mean diameter is over 7 μm, is biaxially stretched. Suitably stretching processes which may be used in the present case include any of the known flat simultaneous or successive biaxially stretching processes or tubular biaxially stretching processes.

In the method of the present invention, the stretching temperature at the stretch initiation point is a temperature in the range over which the β-form crystal is converted to the α-form crystal, i.e., 145° to 176° C. This temperature limitation is a critical part of the stretching step. The stretch initiation point as defined herein means that portion of the polypropylene material where the decrease in thickness of the unstretched molded article is substantially initiated in the stretching step. In terms of a flat, simultaneous biaxial stretching process, the area of decreased thickness corresponds to the portion at which the distance between the facing left and right clips begins to increase. In terms of a flat successive biaxial stretching process, the area of decreased thickness corresponds to the portion at which the thickness of the film begins to decrease in the longitudinally stretched portion. In terms of a tubular biaxial stretching process, the area of decreased thickness corresponds to the portion at which the diameter of the tube passing through the stretching tower heater begins to increase. If the stretching temperature at the stretch initiation point is less than 145° C., it becomes impossible to obtain an excellent polypropylene film for electrical devices, a dense inner structure and a film having a roughened surface composed of a specific surface structure as achieved by the polypropylene material of the present invention. On the other hand, if the stretching temperature is higher than 176° C., no stable stretching can be effected, and it becomes impossible to obtain an excellent polypropylene film for electrical devices which have the roughened surface described above as achieved by the material of the present invention.

Further, when biaxially stretching the polypropylene material, the stretch ratio in one direction in the present method must be less than a factor of 8. This is also an important process consideration. If the stretch ratio in one direction is a factor of 8 or more, it becomes impossible to obtain an excellent polypropylene film for electrical devices, a dense inner surface and a film having a roughened surface composed of a specific surface structure as achieved by method of the present invention. The lower limit of the stretch ratio is substantially regulated by the necking phenomenon. The stretch ratio necessary to complete necking varies depending upon the stretching temperature and the like. Generally, however, the stretch ratio in one direction should range from a factor of 3 to 6.

The method of the present invention makes it possible to prepare a polypropylene film for use in electrical devices by biaxially stretching an unstretched polypropylene molded article having, on at least one side, a surface layer possessing β-form crystals composed of a crystal diameter in the specific range mentioned above under stretching conditions which are satisfied by the two conditions specified above. It is impossible to accomplish the objective of the present invention when an unstretched polypropylene molded article is stretched which does not posses the above-mentioned characteristics under the above specified stretching conditions, or when an unstretched polypropylene molded article having the above-mentioned characteristics is biaxially stretched under stretching conditions which are deficient with regard to at least one of the two above specified important stretching limitations.

The stretched polypropylene film obtained by the process of the present invention possesses excellent mechanical properties, possesses a quite dense inner structure, has a high air-tightness and the surface thereof has an efficiently roughened fine, uneven, structure having crater-like patterns or isotropic network structure and an anisotropic network structure which is aligned in the extrusion direction. Further, because of its peculiar surface structure, the polypropylene film of the present invention, when impregnated with various insulating oils, exhibits excellent impregnability characteristics for insulating oil which cannot be achieved or observed in conventional polypropylene films having a smooth surface. Moreover, the polypropylene film of the present invention has a very dense inner structure, so that when it is used as a dielectric layer for a capacitor, it is possible to obtain a capacitor which does not generate a corona discharge which is derived from fine voids in the interior of the film itself, and which can sufficiently prevent dielectric breakdown derived from corona discharge under low voltage which is derived from voids in the insulating oil-unimpregnated portions of the inside of the capacitor element. In addition, the polypropylene film of the present invention can be used as a film for various electrical devices such as electric cables and transformers which are required to be compact in size, light in weight and long in durability, and thus displays excellent use characteristics.

Having generally described this invention, a further understanding can be obtained by reference to certain specific examples which are provided herein for purpose of illustration only and are not intended to be limiting unless otherwise specified.

EXAMPLE 1

A polypropylene material having an isotacticity index of 97% and a melt index of 4.0 was fed to a thermoplasticization melt extruder and then melt-extruded downward through an annular slit 2 having a lip clearance of 1.5mm in the rig die 1 kept at 250° C. shown in FIG. 1 to form several tubular melts 3. In the instances when the tubular melts 3 where taken up by means of take-up rolls, while the outer surface of the melts thereof were cooled with cooling water 5 in a cooling water tank provided below ring die 1, and while sliding the inner surface of each tubular melt in contact with the outer peripheries of five disc-like members 4 having a slight roundness of 0.5mm in terms of the radius of curvature of the outer periphery, the screw revolutions per minute of the extruder, the temperature of the cooling water tank and the take-up roll rate were altered as shown in Table 1. The unstretched molded articles obtained had surface layers possessing β-form crystals composed mainly of β-form spherulite. The values of the mean diameter thereof and the distribution density measured by the above-mentioned two methods are shown in Table 1. The values obtained by both methods of measurement are essentially consistent with each other.

The thus obtained unstretched tubular molded articles were bi-axially stretched by the tubular biaxial stretching process under such conditions that the stretching temperature at the stretch initiation point was 157° C. and the stretch ratios in both longitudinal and transverse directions were a factor of 6. the stretched material was then subjected to heat treatment with hot air at 140° C. for 30 seconds under a limited shirnkage of 8% whereby a biaxially stretched polypropylene film was obtained. The surface conditions thereof and the oil penetration height which were measured are also shown in Table 1. The measurement of the oil penetration height was conducted in such a manner that the surfaces of each film which possessed a more roughened state were superimposed on each other. The thus treated films were wound around a glass tube of 50mm in diameter, and the wound glass tube was erected in a petri dish. An oil (KIS 500, produced by Kureha Kagaku Co.) was poured into the dish so that the height of the oil level was 5mm as measured from the lower end of the glass tube, and then the height of the oil which ascended between the film surfaces by capillary action at 25° C. for 6 hours was measured.

As can be observed from Table 1, a film can be obtained which has good oil permeation characteristics and which is obtained by biaxially stretching an unstretched molded article having a mean β-form spherulite diameter of over 7 μm and a distribution density thereof of more than 5,000 per cm².

up by means of nip rolls 15 whereby an unstretched molded article was obtained. The unstretched molded articles has surface layers composed mainly of the pillar-like β-form crystal. The mean diameter of cross sections thereof and the distribution density thereof as measured by the previously described two methods are shown in Table 2. The values obtained by the two methods of measurement are essentially consistent.

The thus obtained unstretched tubular molded articles were biaxially stretched by a tubular biaxial stretching process under such conditions that the stretching temperature at the stretch initiation point was 155° C. and the stretch ratio in both longitudinal and transverse directions was a factor of 6. The stretched articles were then subjected to heat treatment with hot air of 145° C. for 30 seconds under a limited shrinkage condition of 8% whereby a biaxially stretched polypropylene film was obtained. The films obtained had anisotropic net- Table 1

| Run No. | Screw Revolution per minute (r.p.m.) | Temperature of cooling water tank (°C.) | Roll take-up rate (m/min.) | Mean diameter of β-form spherulite (μm) | Distribution density of β-form spherulite (number/cm²) | Surface state of film | Oil penetration height (mm) |
|---|---|---|---|---|---|---|---|
| 1 | 15.0 | 85 | 3.25 | 55 | 3,000 | Crater-like materials are sporadic. (Studded with crater-like materials) | 19 |
| 2 | " | 80 | " | " | 15,000 | Crater-like materials are scattered. | 108 |
| 3 | " | 75 | " | 50 | 50,000 | Crater-like materials are massed. | 102 |
| 4 | " | 60 | " | 35 | 100,000 | Isotropic network structure (Irregularities are sharp) | 95 |
| 5 | 100 | 20 | 3.00 | 8 | 450,000 | Isotropic network structure (irregularities are sharp) | 49 |
| 6 | " | " | 5.00 | 5 | " | Isotropic network structure (Irregularities are slightly observable.) | 11 |

EXAMPLE 2

A polypropylene material having an isotacticity index of 95% and a melt index of 3.4 was fed to a melt-extruder, and then melt-extruded downward through the annular slit 7 of ring die 6 kept at 200° C. as shown in FIG. 2 to form a tubular melt 8. Before the tubular melt 8 solidified, the inner surface of the melt 8 was slid in contact with the surface of a 150 mesh chromium-plated aventurine-finished cylindrical member 9 which was kept at the required temperature shown in Table 2 by introducing and discharging a heating medium through introducing pipe 10 and discharging pipe 11. At the same time, the melt 8 was passed downward while the outer surface thereof was cooled with external cooling medium 18 which was kept at the required temperature shown in Table 2. The melt was then taken work structures aligned in the extrusion direction in the surface of the films. The film of Run No. 1 had a locally smooth portion. The film of Run No. 6 had the network structure of the present invention, but the uneven portions thereof were quite small and a good roughened surface was not produced.

The oil penetration heights of the films obtained, as measured in the same manner as in Example 1, are also shown in Table 2.

Table 2

| Run No. | Temperature of cylindrical material (°C.) | Kind of external cooling medium | Temperature of external cooling medium (° C.) | Mean diameter of cross section of pillar-like β-form crystal (μm) | Distribution density of pillar-like β-form crystal (number/cm²) | Oil penetration height (mm) |
|---|---|---|---|---|---|---|
| 1 | 130 | air | at room temperature | 60 | 500 | 21 |
| 2 | 110 | " | " | 48 | 3,200 | 112 |
| 3 | 90 | " | " | 35 | 5,000 | 106 |
| 4 | " | water | 20 | 24 | " | 88 |
| 5 | 40 | " | 30 | 10 | 35,000 | 53 |
| 6 | 20 | " | 18 | 6 | " | 14 |
| 7 | 50 | " | 30 | 13 | 100,000 | 65 |

EXAMPLE 3

Unstretched tubular molded articles were prepared in the same manner as described in Example 2, except that the temperature of the cylindrical member 9, the type of external cooling medium 18 and the temperature thereof were varied as shown in Table 3. At the same time, the resin temperature at the time of die extrusion was maintained at 200° C., and the average extrusion linear velocity was kept at 6.7 cm/sec. The unstretched molded articles obtained had surface layers composed mainly of pillar-like β-form crystals. The mean diameter of the cross section of the crystals and the distribution density thereof were measured by the above-mentioned two methods and are shown in Table 3.

Subsequently, the unstretched molded articles were biaxially stretched and then subjected to a heat treatment under the same conditions as described in Example 2. The thus obtained films had anisotropic network structures aligned in the extrusion direction in the surfaces of the films.

The oil penetration heights of the films obtained, as measured in the same manner as described in Example 1, are also shown in Table 3.

Table 3

| Run No. | Temperature of cylindrical member (° C.) | cross section of cooling medium Kind of external cooling medium | Distribution of external cooling medium (° C.) | Medium diameter of pillar-like β-form crystals (μm) | density of pillar-like β-form crystal (number/cm²) | Oil penetration height (mm) |
|---|---|---|---|---|---|---|
| 1 | 20 | water | 80 | 20 | 16,000 | 71 |
| 2 | 0 | air | 50 | 24 | 20,000 | 85 |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the U.S. is:

1. A process for producing a polypropylene film for electrical devices which comprises:
   biaxially stretching an unstretched isotactic polypropylene molded article, wherein the polypropylene is devoid of β-form nucleating agent and has an isotacticity of at least 90%, having, on at least one side, a surface layer containing β-form crystals of which the mean diameter is from 7 to 100 μm and the density of said crystals is at least 1000/cm² and being devoid of β-form crystals in the interior thereof under such conditions that the stretching temperature at the stretch initiation point is in the range of 145° to 176° C. and the stretch ratio in one direction is a factor of 3 to less than 8.

2. The process of claim 1, wherein the β-form crystals of the surface layer of said unstretched polypropylene molded article is β-form spherulite.

3. The process of claim 2, wherein the distribution density of the β-form crystals of said surface layer of said unstretched polypropylene molded article is more than 5,000 per cm².

4. The process of claim 3, wherein said unstretched polypropylene molded article is prepared by melt-extruding a crystalline polypropylene material which does not contain a β-form crystallization nucleating agent through a ring die in the shape of a tubular melt; instantaneously or intermittently sliding the inner surface of said melt in contact with the outer periphery of at least one disc-like member which possess a slight roundness at the outer periphery, while maintaining the inner surface of said melt at a temperature in the range of 130° to 200° C.; simultaneously cooling the outer surface of said melt with a cooling medium maintained at a temperature in excess of 40° C.; and then taking up the resulting unstretched molded article.

5. The process of claim 1, wherein the β-form crystals of the surface layer of the unstretched polypropylene molded article are of a pillar-like β-form crystal, which are aligned in the direction of extrusion.

6. The biaxially stretched isotactic polypropylene film prepared by the process of Claim 1, wherein said polypropylene is devoid of β-form nucleating agent and has an isotacticity of at least 90%, 7. The process of claim 5, wherein said unstretched polypropylene molded article is prepared by melt-extruding a crystalline polypropylene material which does not contain a β-form crystallization nucleating agent through a ring die in the shape of a tubular melt; sliding the inner surface of said melt in contact with a cylindrical member maintained at a temperature in the range of 30° to 110° C.; simultaneously cooling the outer surface of said melt with a cooling medium at a temperature below the temperature of said cylindrical member; and then taking up the resulting unstretched molded article.

8. The process of claim 5, wherein said unstretched polypropylene molded article is prepared by melt-extruding a crystalline polypropylene material which does not contain a β-form crystalline nucleating agent through a ring die, under such conditions that the resin temperature at the time of extrusion from the die orifice is a temperature up to 230° C. and the average extrusion linear velocity from the die orifice is at least 1.5 cm/sec. in the shape of a tubular melt, contacting the outer surface of said melt with a first cooling medium having a temperature of 45° C. to 130° C.; simultaneously contacting the inner surface of said melt with a second cooling medium having a temperature lower than that of said first cooling medium and then taking up the resulting unstretched molded article.

* * * * *